(12) United States Patent
Baduge

(10) Patent No.: US 11,235,353 B2
(45) Date of Patent: Feb. 1, 2022

(54) BAGGAGE SORTING SYSTEM

(71) Applicant: PANASONIC INTELLECTUAL PROPERTY MANAGEMENT CO., LTD., Osaka (JP)

(72) Inventor: Thilmee Baduge, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 75 days.

(21) Appl. No.: 16/649,009

(22) PCT Filed: Sep. 7, 2018

(86) PCT No.: PCT/JP2018/033119
§ 371 (c)(1),
(2) Date: Mar. 19, 2020

(87) PCT Pub. No.: WO2019/065153
PCT Pub. Date: Apr. 4, 2019

(65) Prior Publication Data
US 2020/0290090 A1    Sep. 17, 2020

Related U.S. Application Data

(60) Provisional application No. 62/563,397, filed on Sep. 26, 2017.

(51) Int. Cl.
*B07C 3/14* (2006.01)
*B07C 3/08* (2006.01)

(52) U.S. Cl.
CPC . *B07C 3/14* (2013.01); *B07C 3/08* (2013.01)

(58) Field of Classification Search
CPC .................................. B07C 3/08; B07C 3/14
See application file for complete search history.

(56) References Cited

U.S. PATENT DOCUMENTS 7,090,134 B2    8/2006  Ramsager
2006/0113387 A1*  6/2006  Baker .................. B07C 3/14
                                                    235/462.12

FOREIGN PATENT DOCUMENTS

JP      04-023709       1/1992
JP      2017-088388     5/2017

OTHER PUBLICATIONS

International Search Report issued in International Patent Application No. PCT/2018/033119, dated Nov. 27, 2018.

* cited by examiner

*Primary Examiner* — Michael McCullough
*Assistant Examiner* — Jessica L Burkman
(74) *Attorney, Agent, or Firm* — Greenblum & Bernstein, P.L.C.

(57) ABSTRACT

There is provided a projection instruction device that generates a projection image to be projected on a parcel based on a reading result of parcel identification information included in a label attached to the parcel, the device including: a processor; and a memory, in which by cooperating with the memory, the processor detects occurrence of an error, and moves the parcel to upstream in a case where the occurrence of the error is detected.

10 Claims, 10 Drawing Sheets

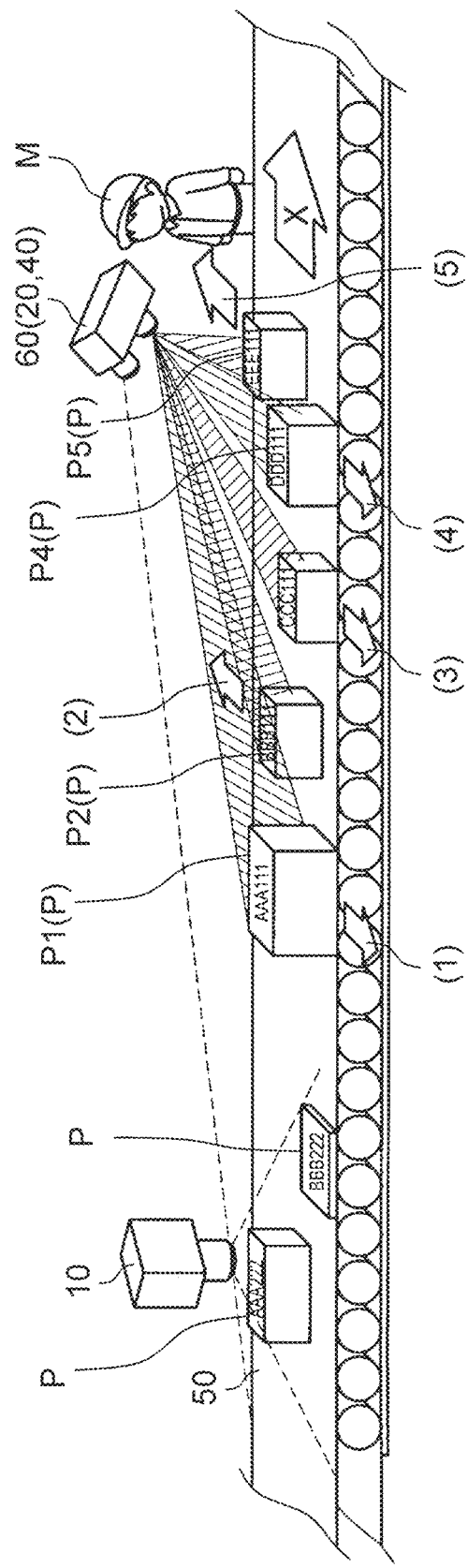
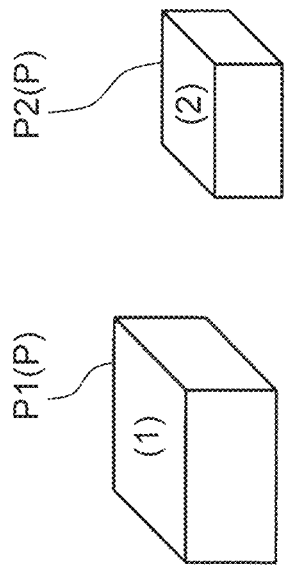

FIG. 9

| ERROR TYPE | PROJECTION IMAGE | CORRESPONDENCE OF WORKER |
|---|---|---|
| CONVEYOR ERROR | ✗ | UNLOAD PARCEL FROM CONVEYOR |
| RECOGNITION ERROR | ? | MANUALLY CHECK AND SORT LABEL RECORD INFORMATION. |
| PASS ERROR | 1 2 3 / 1 | QUICKLY SORT PARCEL TO SORTING DESTINATION INDICATED BY PROJECTION IMAGE |
| GENERAL ERROR | Err | WAIT FOR INSTRUCTION OF MANAGER |

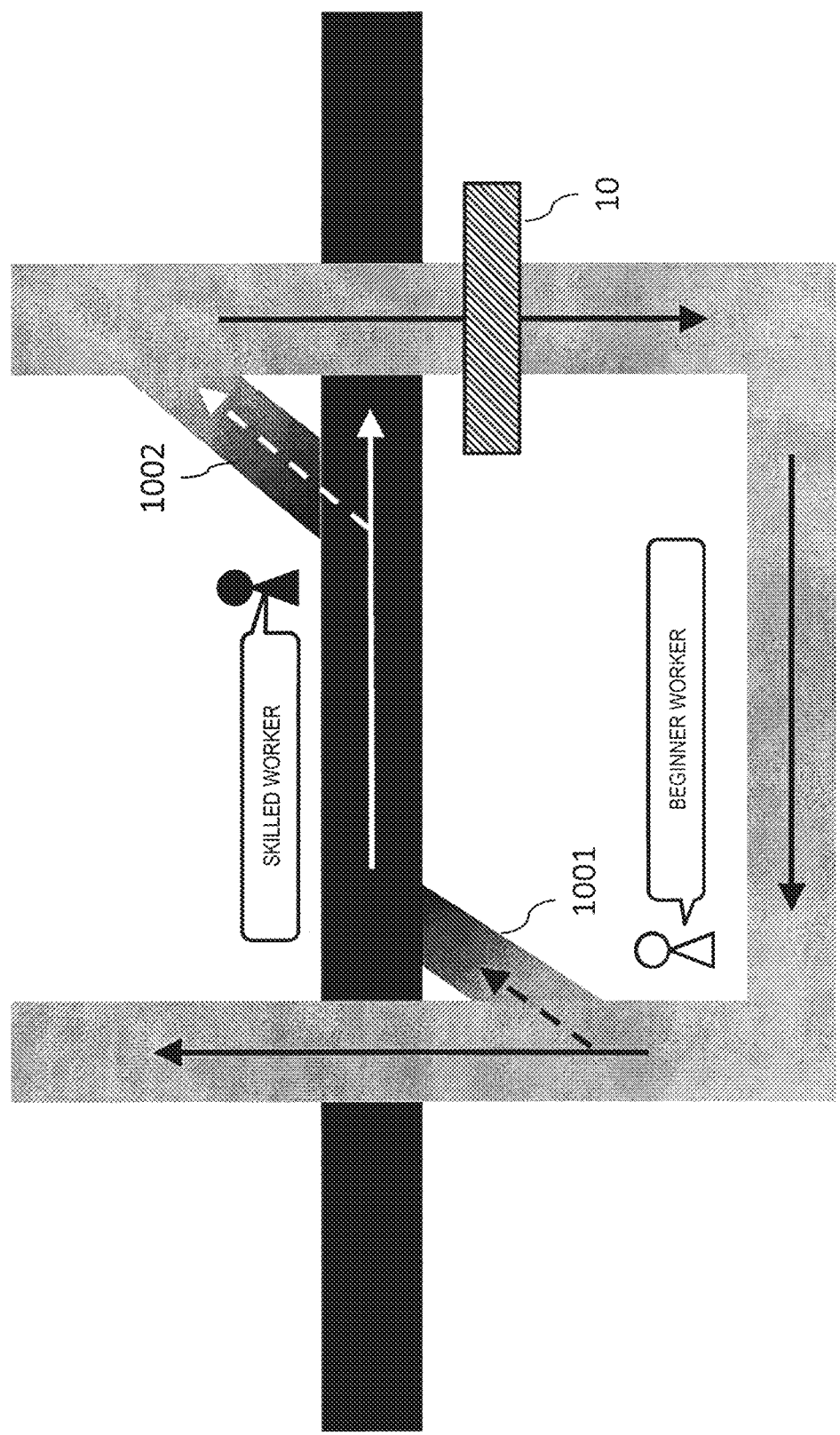

BAGGAGE SORTING SYSTEM

TECHNICAL FIELD

The present disclosure is related to a parcel sorting system useful to sort parcels.

BACKGROUND ART

As recent economic activity rises, the amount of parcel circulation tends to increase. In a circulation process of parcels, sorting work for sorting the parcel by destination is a time-consuming process and relies on manual work from before, but a technology of automating at least a part of the sorting work is proposed.

PTL 1 discloses a system in which moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

Meanwhile, in recent years, the amount of parcel circulation has been increased more and more and types of parcel have also become various, so that a technology of effectively and precisely sorting the parcel is required.

The present disclosure is related to the technology of effectively and precisely sorting the parcel.

According to the present disclosure, there is provided a parcel sorting system including: a label reader that reads parcel identification information from a label attached to a parcel; a processor; and a memory. By cooperating with the memory, the processor includes a projection instruction device that instructs to project a projection image on the parcel based on the parcel identification information read by the label reader; and a transport conveyor that transports the parcel from an upstream side of the label reader to a downstream side, in which the transport conveyor further includes a path capable of moving the parcel from a region in which the projection image is projected to upstream of a location at which the label reader is disposed. In a case where the label reader fails to read the label attached to the parcel, the projection instruction device projects, on the parcel, an image, which guides the parcel to a path capable of moving the parcel to upstream of a location at which the label reader is disposed.

According to the present disclosure, it is possible to more effectively and precisely sort parcel and to further deal with an increase in the amount of parcel circulation. Specifically, in the present disclosure, it is possible for a worker for sorting to recognize occurrence of an error and target parcel having the error simultaneously by generating a projection image indicating the occurrence of the error and projecting the projection image on the target parcel having the error in a case where the error occurs in a parcel sorting system. As a result, efficiency of the sorting operation can be improved.

BRIEF DESCRIPTION OF DRAWINGS

FIG. 3A is a conceptual diagram illustrating a status in which the parcel sorting system is installed in a distribution center and is in operation.

FIG. 3B is a diagram illustrating a state in which a projection image including a number is projected on an upper surface of parcel.

FIG. 9 is a diagram illustrating a correspondence between a projection image corresponding to an error type and a worker.

FIG. 10 is a schematic diagram illustrating disposition of the transport conveyor for realizing the process described above, in a case of adopting a transport conveyor on which a skilled worker performs sorting as an example of another transport conveyor.

DESCRIPTION OF EMBODIMENTS

Hereinafter, embodiments (hereinafter, referred to as "present embodiment") which specifically disclose a parcel sorting system according to the present disclosure will be described in detail with reference to appropriate drawings. However, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 9.

[Configuration]

Figure 1:
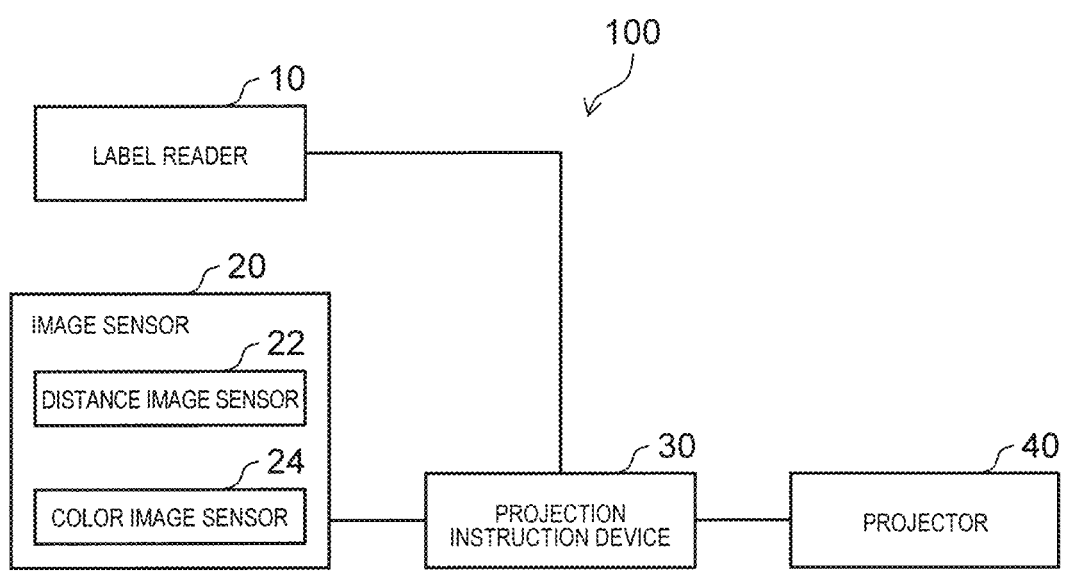
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, image sensor 20, projection instruction device 30, and projector 40. Parcel sorting system 100 is a system which supports work of a worker who sorts parcel transported by a transport conveyor. Parcel sorting system 100 is installed at the distribution center owned by, for example, a retailer, a wholesaler, an internet distributor, or the like. Parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of image sensors 20, a plurality of projection instruction devices 30, and a plurality of projectors 40. The number of each component can be appropriately modified according to the purpose.

Label reader 10 as a reading device is a device which includes various components such as a lens (not illustrated), an image sensor, and the like. By using label reader 10, it is possible to read label recording information recording various types of information related to the parcel from a label attached to the parcel transported by the transport conveyor. By using the read label recording information, it becomes possible to specify the parcel. By the read information, parcel identification information is defined.

Image sensor 20 is an imaging device which includes various components such as a lens (not illustrated), an image sensor, and the like. Image sensor 20 is generally configured by an imaging camera. The imaging camera is a three-dimensional camera, a plurality of two-dimensional cameras, or the like. Image sensor 20 includes distance image sensor 22 and color image sensor 24.

Distance image sensor 22 images the parcel transported by the transport conveyor and generates a distance image. The generated distance image is used as information indicating a position of the parcel, a distance to the parcel, a size of the parcel, and the like. "Distance image" means an image including distance information indicating a distance from an imaging position to a position (including a surface of parcel) indicated by each of pixels (that is, "image" in the present disclosure includes a distance image). In addition, a term of "distance image" includes one which cannot be recognized as an image by human eyes, such as a table or the like listing numerical values indicating a distance. That is, "distance image" may be information indicating a relationship between coordinates and a distance in the imaged region, and a data structure is not limited thereto. In the present disclosure, distance image sensor 22 is used for specifying the position of the parcel. Therefore, distance image sensor 22 also can be replaced with another sensing device (an ultrasonic sensor, an infrared sensor, a stereo camera, and a monocular video camera).

Color image sensor 24 images parcel generated by the distance image and generates a color image. "Color image" refers to an image in which a color of a surface of parcel is expressed with a predetermined gradation, and the "gradation" includes not only 256 gradations of RGB but also all kinds of grayscales or the like. Color image sensor 24 in the present disclosure is used for tracking each parcel, for the parcel specified by distance image sensor 22. Color image sensor 24 also can be replaced with another sensing device (an ultrasonic sensor, an infrared sensor, a stereo camera, and a monocular video camera).

That is, in the present disclosure, a term of "image" includes both of a distance image and a color image. In the present disclosure, information output from an image sensor as a sensing device including a distance image sensor and a color image sensor is referred to as sensing information. In the present embodiment, an example of the sensing device will be described by using image sensor 20 (including distance image sensor 22 and color image sensor 24). In addition, in the present embodiment, an example of the sensing information will be described by using a distance image output by distance image sensor 22 and a color image output by color image sensor 24.

Figure 2:
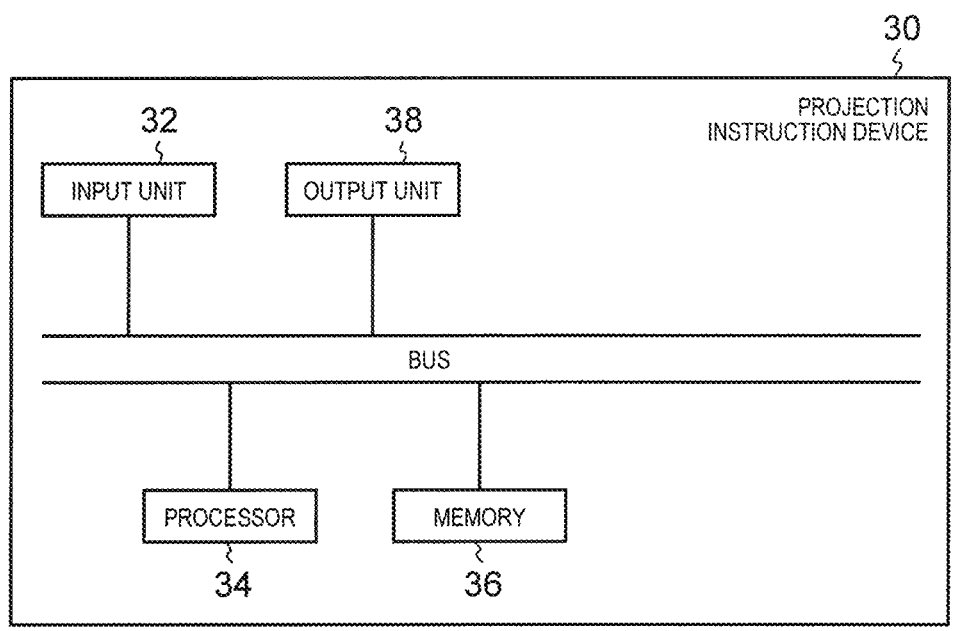
FIG. 2 is a block diagram illustrating a configuration of a projection instruction device according to the embodiment.

Projection instruction device 30 functions as a calculation device in parcel sorting system 100. As illustrated in FIG. 2, projection instruction device 30 includes input unit 32, processor 34, memory 36, and output unit 38 connected with one another via a bus. Input unit 32 receives parcel identification information for specifying parcel obtained from the label recording information read by label reader 10, a distance image generated by distance image sensor 22, and a color image generated by color image sensor 24. Processor 34 is configured by a general calculation device and generates a projection image to be projected on parcel based on the parcel identification information, the distance image, and the color image. Memory 36 as a storage device reads a control program necessary for various processes by processor 34 and performs an operation such as data backup. That is, processor 34 and memory 36 control various processes by projection instruction device 30 by cooperating with each other. Output unit 38 outputs the projection image generated by processor 34 to projector 40. In the present disclosure, "processor" does not mean only a single processor. "Processor" means an operator having a plurality of processors having an identical purpose, or a plurality of processors having different purposes in a case where they perform processes in collaboration with one another (for example, general-purpose central processing unit (CPU) and a graphic processing unit (GPU)).

Projector 40 is configured by a general projection device, and projects projection light including the projection image received from projection instruction device 30, on the parcel and displays the projection image onto the parcel.

Parcel sorting system 100 can be configured to include label reader 10, image sensor 20 (distance image sensor 22 and color image sensor 24), projection instruction device 30, and projector 40 connected with one another in wired communication or in wireless communication. In addition, parcel sorting system 100 also can be configured to include two or more devices of any of label reader 10, image sensor 20, projection instruction device 30, and projector 40 as an integral device. For example, image sensor 20 and projector 40 can be combined to construct an integral imaging projection device (see FIG. 3A).

[Outline of System]

FIG. 3A is a conceptual diagram illustrating a status in which parcel sorting system 100 is installed in the distribution center and is in operation. In the related art, each of workers M visually checks the label attached to each parcel P transported by transport conveyor 50 in the arrow X-direction. When the parcel to be delivered by the worker himself arrives, worker M needs to pick up the parcel and place the parcel once in the vicinity such as the worker's own feet, a basket, and a truck bed. However, in a case of visually sorting by the worker, there is a limit in work efficiency of the worker, so that it is necessary to limit a transport speed to a predetermined value or less. As a result, a limit value of the amount of parcel which the worker can sort in a unit time, was few. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each parcel P transported by transport conveyor 50. In the label, the label recording information including various information related to the parcel is described. The label recording information includes information similar to a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, image sensor 20 images the image (the distance image and the color image) of parcel P transported by transport conveyor 50 and obtains information such as a position of parcel P, a distance to parcel P, a size (lengths of three sides when parcel P is rectangular parallelepiped) of parcel P, a color of parcel P, a pattern of parcel P, and the like. Further, positions of label reader 10 and image sensor 20, a type of the sensing device, and an order of processes are not particularly limited to the illustrated embodiments. As described above, in the present example, image sensor 20 and projector 40 are configured as an integrated imaging projection device 60 and are disposed above transport conveyor 50.

Projection instruction device 30 (not illustrated in FIGS. 3A and 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image and the color image generated by image sensor 20. Projection instruction device 30 transmits a projection instruction to project the projection image on parcel P, to projector 40.

Figure 4:
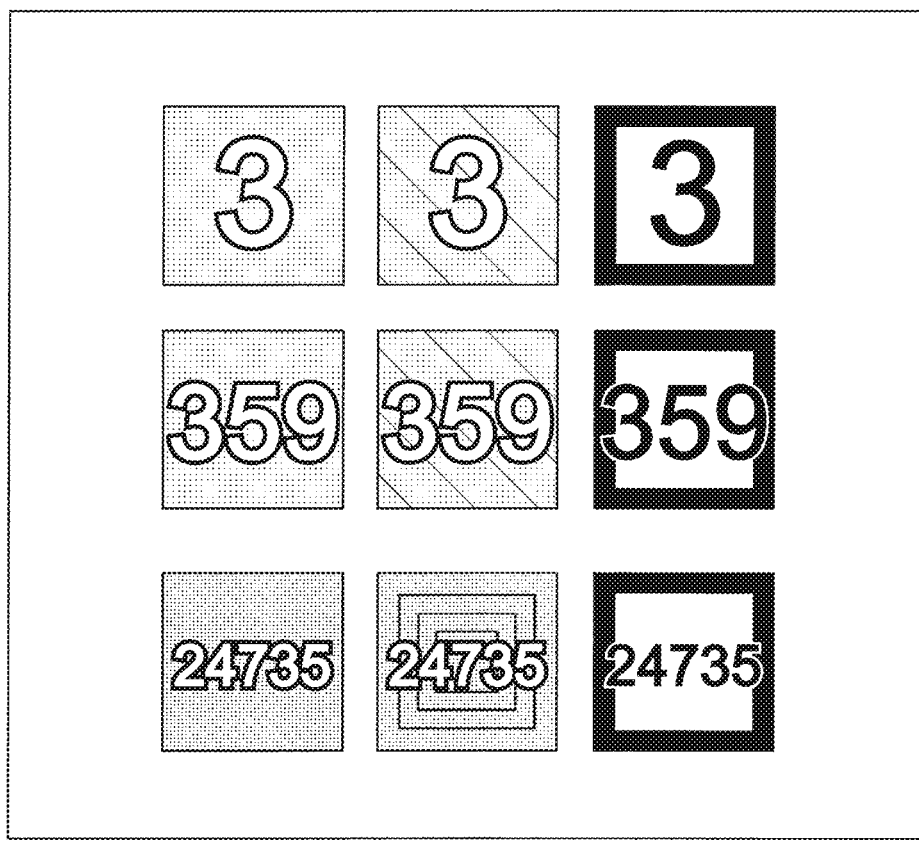
FIG. 4 is a diagram illustrating an example of a projection image generated by the projection instruction device according to the embodiment.

Projector 40 which receives the projection instruction, as an image projection device, projects projection light including the projection image generated by projection instruction device 30 on parcel P and displays the projection image on parcel P. Here, the projection image displayed on parcel P is, for example, an image of an encircled number having a color indicating a sorting location corresponding to a delivery address of parcel P (see FIG. 3B). Here, the encircled number corresponds to, for example, a number of a truck carrying sorted parcel P (a number of the truck itself, a parking lot number, or the like), a number of a shelf or a box to be carried into the truck, or the like. Further, instead of directly corresponding to the number such as the shelf or the box, the encircled number may correspond to a number of a shooter which moves the picked-up parcel to another location or a truck. Since a parking position of the truck or the like frequently changes according to a traffic condition or the like, it may be difficult to correspond to the sorting destination viewed from the periphery of transport conveyor 50 at any time. Therefore, the shooter is sandwiched between transport conveyor 50 and the transport truck, and a number of the shooter is projected on the periphery of transport conveyor 50, so that even if a configuration on the periphery of the transport conveyor 50 is not changed as needed, it is possible to deal with the change of the sorting destination by disposing an opening of the shooter. Certainly, according to a status, various types of projection images are displayed. Another example of displaying the number may be a zip code corresponding to the delivery address, a number of a worker who picks up parcel P, or the like. In addition, as an example of displaying information other than the number, an arrow indicating the sorting direction (such as right or left in a transport direction of transport conveyor 50) or characters (such as "left" and "right") may be used. Further, a display form is not limited to the encircled number, and various types such as numbers surrounded by squares ("3", "359", and "24735") as illustrated in FIG. 4 are conceivable. Furthermore, the projection image is not limited to numbers or characters enclosed with a frame, but may be white numbers or characters with a solid background. In addition, the shape of the number or character to be displayed such as a circle, a triangle, a square, or the like may be switched according to information to be displayed. Further, a picture capable of being individually associated with each information to be displayed may be displayed. The projection image is not limited to a still image, and may be an animation. As an example of the animation, the example described above may be blinked, enlarged or reduced, and a color may be changed. An animation reflecting the sorting direction may be projected. An example of the animations reflecting the sorting direction may include various patterns, for example, moving light ray or light spot in the sorting direction, forming all or a part of the projection image in the sorting direction, changing the color of the projection image in the sorting direction, and displaying an arrow moving in the sorting direction, and the like. In a case where only a part of the projection image is a target of the animation, a part having a large influence on determination of the sorting destination by a worker, such as a number, an arrow, or the like, may be not changed, and a part not affected by the sorting destination such as a frame line may be changed. Meanwhile, in a situation in which it is more efficient to convey the sorting direction more intuitively than the meaning of the number or the like projected within the frame line, such as a case where there are few options for the sorting destination, a number, an arrow, or the like may be moved in the sorting direction within a fixed frame line. The animation may be repeatedly projected or may be projected only once. In the present disclosure, "image projection device" is not limited to a device which directly projects a light beam on the parcel. In the present disclosure, "image projection device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

In FIG. 3A, worker M (omitted for other workers) in charge of picking up the parcel stands beside transport conveyor 50 and the parcel arriving each region is picked up from transport conveyor 50 as indicated by encircled number 1, encircled number 2, encircled number 3, or the like.

For example, parcel P1 has parcel identification information of "AAA111" on a label, and the parcel identification information of "AAA111" specifies that the parcel is a target to be sorted in region A. Here, when parcel P1 reaches the specific region, processor 34 transmits the generated projection image to projector 40 as illustrated in FIG. 3B. Projector 40 projects the projection image on parcel P1. The worker in the region can easily pay attention to parcel P1, to be picked up by the worker, which reaches the specific region of the worker, accordingly, the parcel can be sorted more efficiently and precisely.

In the present embodiment, as illustrated in FIG. 3A, whether or not one projector 40 projects the image on a plurality of specific regions may be switched and whether or not a plurality of projectors 40 project the image on each of the specific regions may be switched.

Hereinafter, in parcel sorting system 100 according to the embodiment, an outline of an operation of sorting the parcel performed by projection instruction device 30 will be described.

[Outline of Operation]

Figure 5:
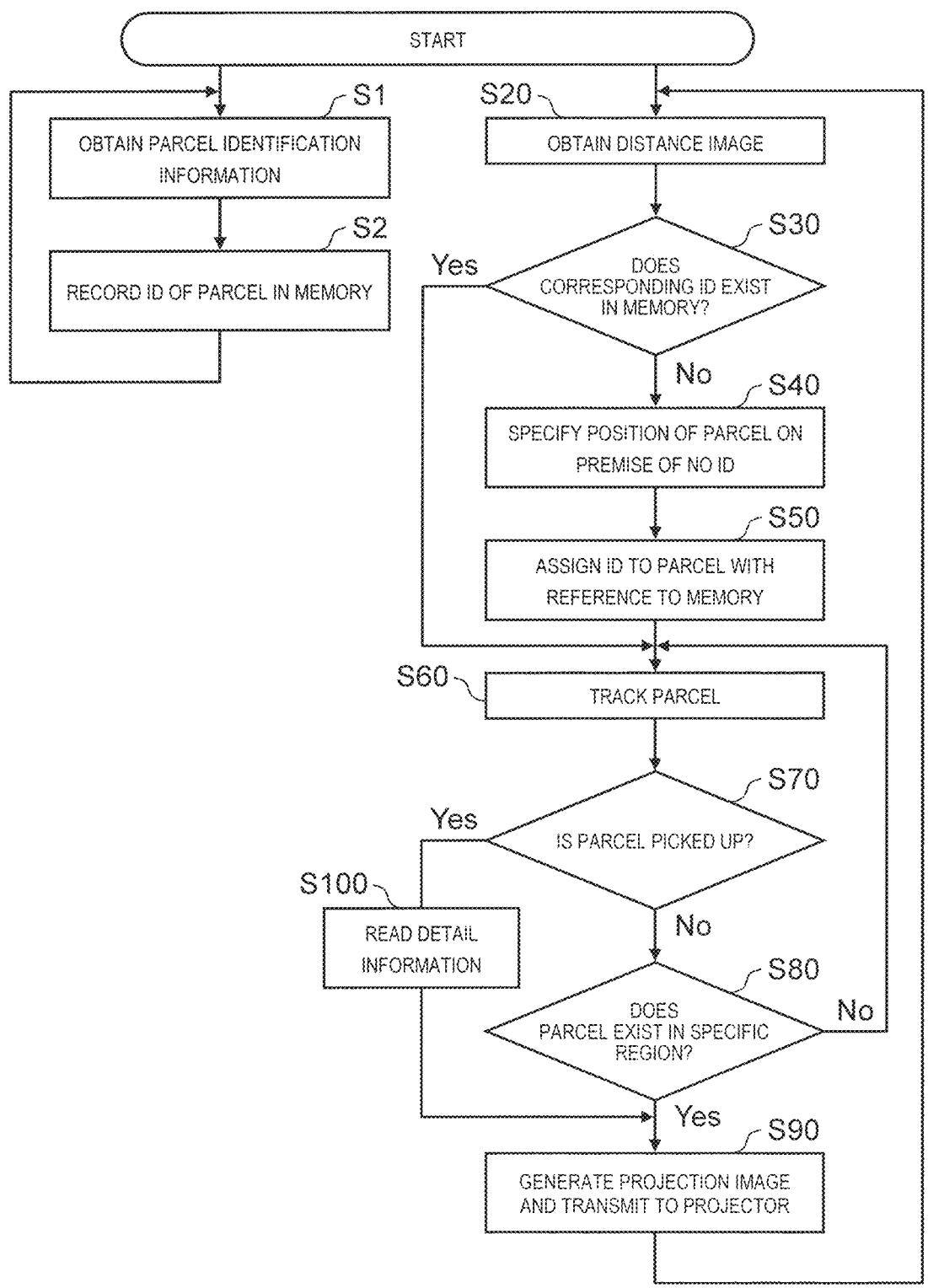
FIG. 5 is a flowchart illustrating an outline procedure of an operation mainly performed by the projection instruction device.

FIG. 5 is a flowchart illustrating an outline procedure of an operation of mainly performed by projection instruction device 30 of the present embodiment, particularly processor 34 of projection instruction device 30. First, after label reader 10 reads the label recording information of the label of the parcel, input unit 32 of projection instruction device 30 obtains the parcel identification information corresponding to the label recording information from label reader 10 (step S1). The parcel identification information is information including at least one piece of information similar to the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2). The ID recorded in memory 36 may be the parcel identification number originally recorded in the parcel identification information or may be assigned by projection instruction device 30 generating a new ID.

On the other hand, in parallel with step S1 and step S2, after distance image sensor 22 of image sensor 20 images the distance image of the parcel, input unit 32 of projection instruction device 30 obtains the distance image as the sensing information from distance image sensor 22 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 22 by a distance (assumed to be known) between label reader 10 and distance image sensor 22 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured for a time unit. Processor 34 can estimate the ID of the parcel in the distance image obtained in predetermined step S20 by the measured distance between the parcel (or the ID) and label reader 10, a distance of the parcel in the distance image obtained in step S20, and a distance (assumed to be known) between two distance image sensors.

In this way, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, when processor 34 subtracts the time required for the parcel to move between label reader 10 and distance image sensor 22 from the time when the distance image is obtained, a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, a case where a time difference is equal to or smaller than a predetermined time), processor 34 can determine that the ID corresponding to the parcel included in the distance image exists in memory 36. In a case where it is determined that the ID corresponding to the parcel exists in memory 36 (Yes in step S30), the process moves to step S60 and subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50).

In parallel with the above steps, color image sensor 24 generates a color image for each parcel of which a distance image is obtained. Processor 34 tracks the parcel, to which the ID is attached, transported and moved by transport conveyor 50 based on the color image from color image sensor 24 obtained by input unit 32 (step S60). Based on the color image likewise, processor 34 determines whether or not the worker picks up the tracked parcel (step S70). In a case where it is determined that the parcel is not picked up by the worker (No in step S70), processor 34 determines whether or not the parcel exists in a specific region (a predetermined sorting area in which parcel is to be picked up) described below. In a case where it is determined that the parcel exists (reaches) in the specific region (Yes in step S80), processor 34 generates the projection image and transmits the projection image to projector 40 (step S90). In a case where it is not determined that the parcel exists (reaches) in the specific region (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from projection instruction device 30, projects the projection image on the corresponding parcel.

The above is the outline of the operation procedure performed by processor 34 and the like of projection instruction device 30. Of course, the operation procedure is not limited to that described above. For example, the determination in step S70 can be omitted. In addition, for the determination in step S70, it is possible to use contact determination between a hand of the worker and the parcel, a color image, a distance image, or the like. Hereinafter, further detailed procedures of each process will be described.

[Projection for Enabling Worker M to Recognize Error Occurring in Sorting of Parcel]

For example, there are the following three cases where an error occurs in parcel sorting.

(1) A case where label recording information (parcel identification information) of a label attached to parcel is not normally read by label reader 10.

(2) A case where a predetermined condition is not satisfied even if the label recording information can be normally read.

(3) A case where the parcel being transported passes through a specific region (a predetermined sorting area) without being picked up even if the label recording information is normally read and the predetermined condition is satisfied.

It is difficult for a worker to recognize that various errors occur.

In the present disclosure, it is detected that an error occurs in parcel sorting and a projection image indicating the error occurrence is generated. Based on sensing information of parcel in addition to a reading result of label recording information from a label attached to the parcel, it is detected that the error occurs. In this case, the sensing information used for detecting error occurrence is a distance image and a color image, and both or either is used. The projection image indicating the error occurrence can be alerted to the worker effectively by setting a color different from that in the normal time, for example.

Figure 6:
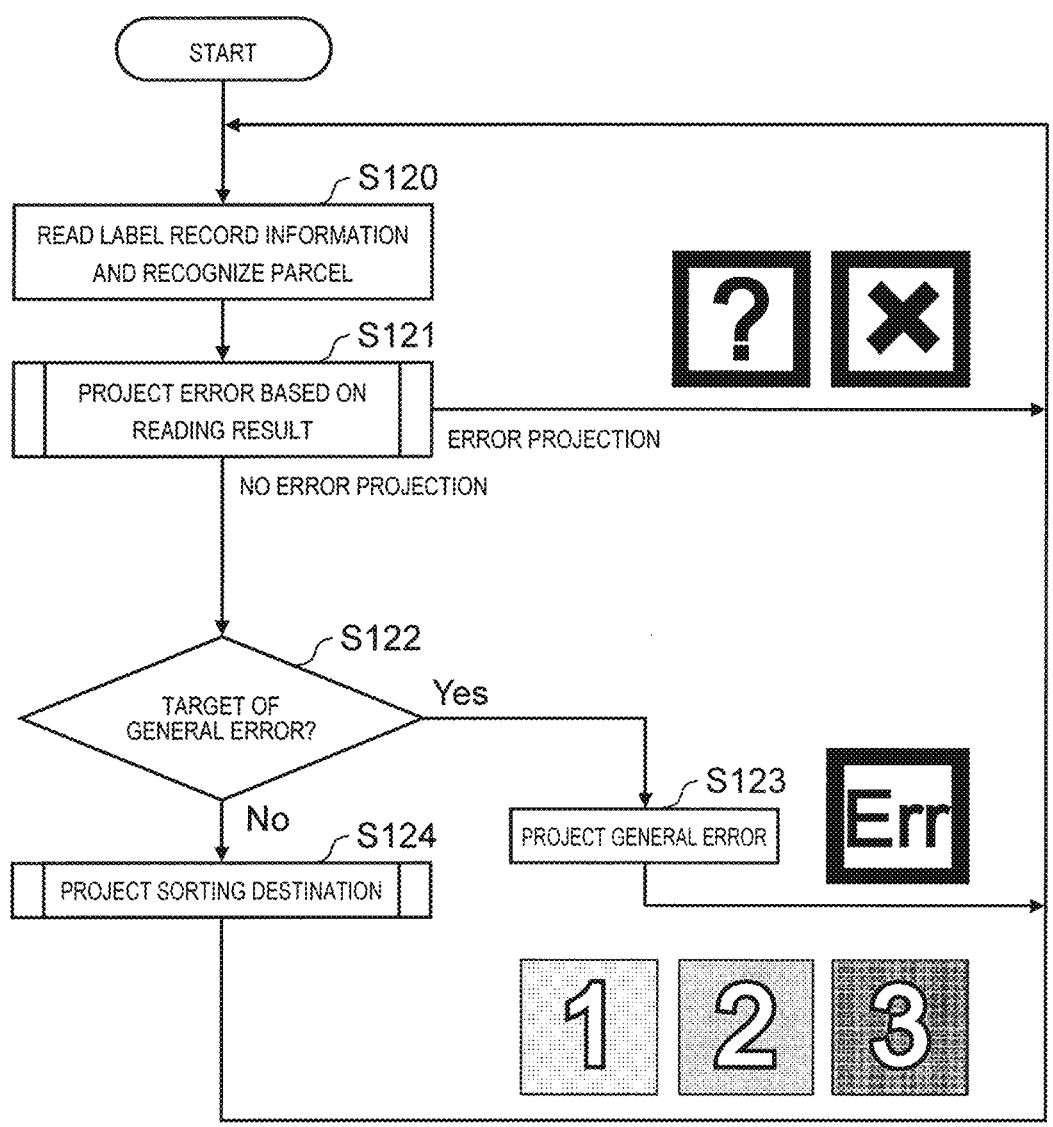
FIG. 6 is a flowchart illustrating all processes of recognizing and projecting parcel.
Figure 7:
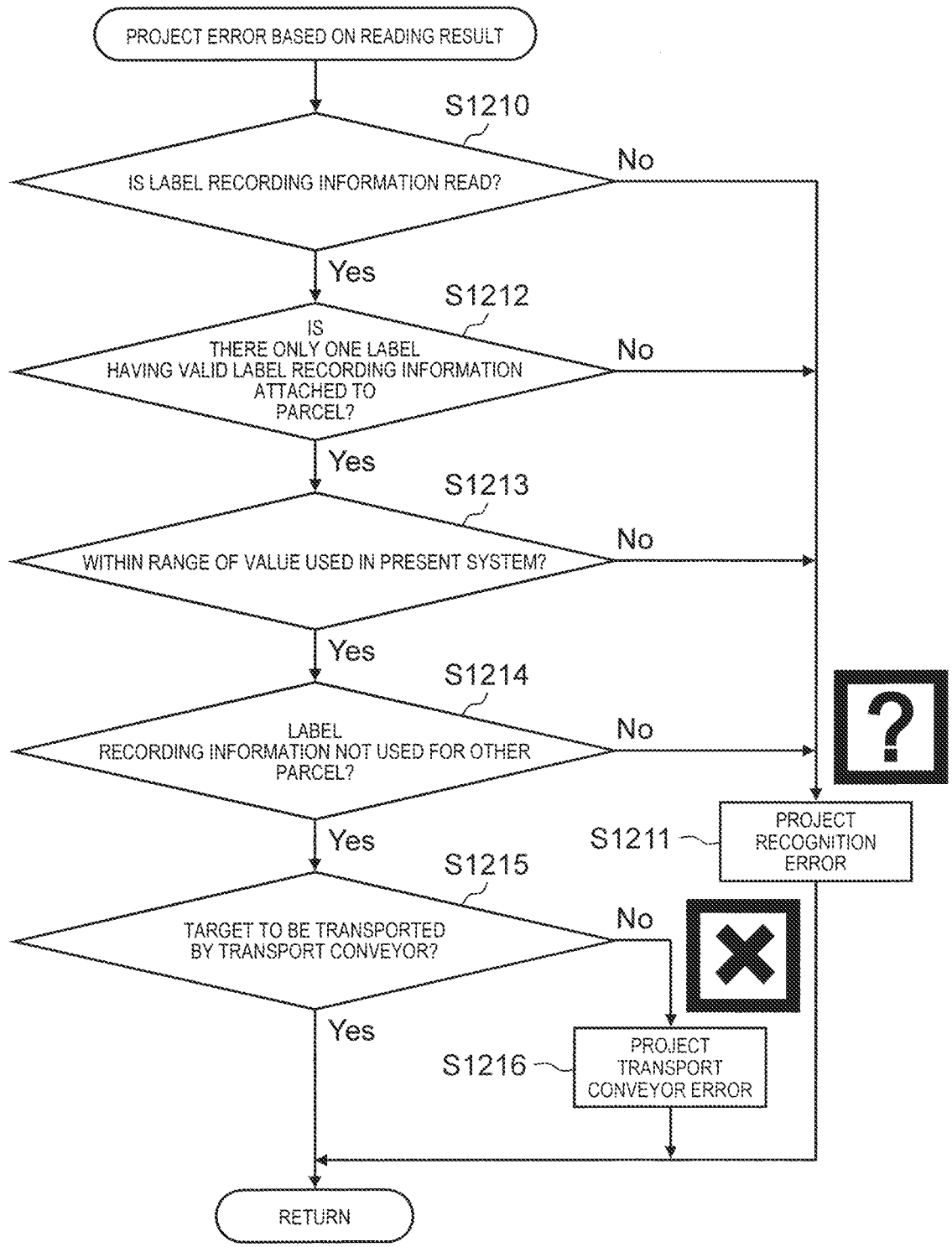
FIG. 7 is a flowchart illustrating some processes of recognizing and projecting parcel.
Figure 8:
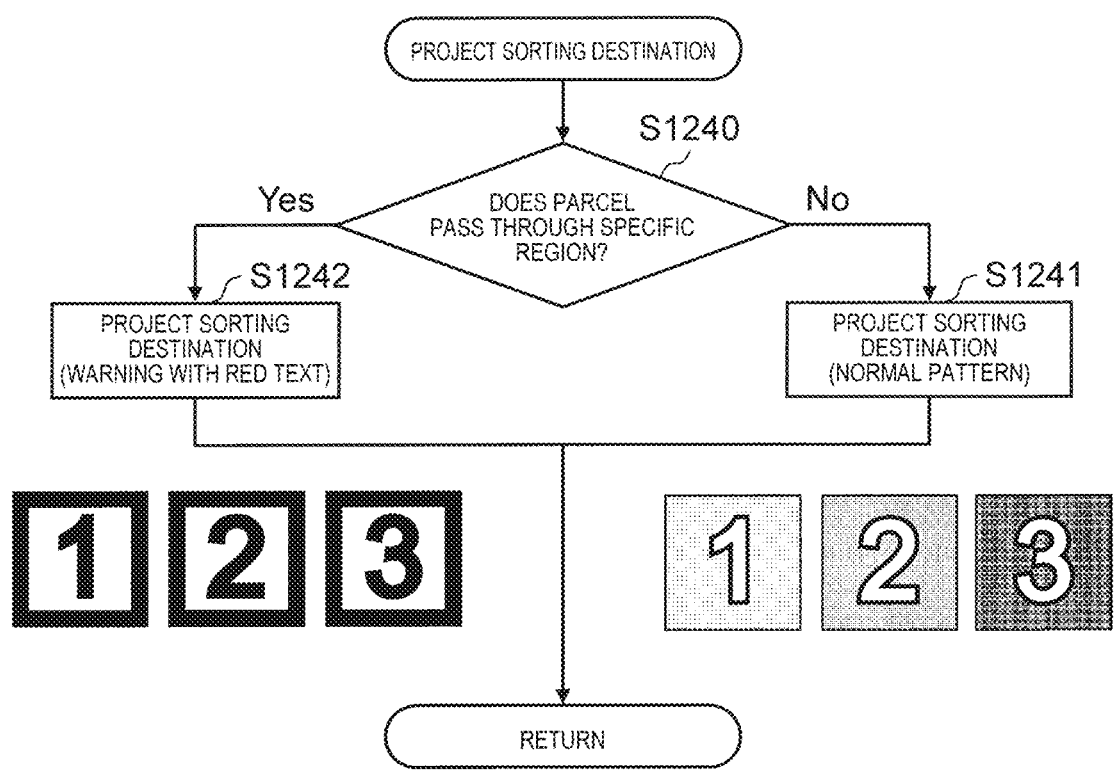
FIG. 8 is a flowchart illustrating some processes of recognizing and projecting parcel.

FIG. 6 is a flowchart (so-called main routine) illustrating all processes of recognizing and projecting parcel. FIGS. 7 and 8 are flowcharts (so-called subroutines) illustrating some processes of recognizing and projecting parcel. As described above, processor 34 operates in cooperation with memory 36. In FIG. 6, processor 34 first reads label record information (for example, a barcode) of a label attached to parcel and recognizes the parcel (step S120). If necessary, an error projection process based on the reading result is performed (step S121). The error projection process based on the reading result is performed as illustrated in FIG. 7. In FIG. 7, processor 34 first determines whether or not label recording information is read, according to a reading result of the label recording information (step S1210). In a case where it is determined that the label recording information cannot be read (No in step S1210), processor 34 generates a projection image indicating a parcel recognition error (step S1211). For example, a projection image of a color (for example, red) different from the normal time is generated in a square frame including "?". After generating the projection image indicating the parcel recognition error, processor 34 returns to the main routine and restarts the process from step S120.

In a case where it is determined that the label recording information is read (Yes in step S1210), processor 34 determines whether or not there is only one label having valid label recording information attached to parcel (step S1212). In a case where it is determined that there is not one label having the valid label recording information attached to the parcel (No in step S1212), processor 34 generates a projection image indicating a parcel recognition error (step S1211). For example, a red projection image is generated with a square frame including "?" as described above. After generating the projection image indicating the parcel recognition error, processor 34 returns to the main routine. Here, both of a case of "there are a plurality of labels on one parcel" and a case of "a plurality of parcels are too close" are errors, and a projection image indicating a parcel recognition error is generated. In the latter case, that is, in the case of "a plurality parcels are too close", processor 34 erroneously recognizes the plurality of parcels as one parcel, and as a result, a plurality of pieces of label record information are found from "parcel recognized as one parcel".

In a case where it is determined that there is only one label having valid label recording information attached to parcel (Yes in step S1212), processor 34 determines whether or not being within a range of a value used in the present system (that is, parcel sorting system 100 in the embodiment) (step S1213). This determination is provided for assuming a case where a value such as 100 is output even though there are only 1 to 10 sorting destinations, for example. In a case where it is determined that a sorting destination is not within the range of the value used in the present system (No in step S1213), processor 34 generates a projection image indicating a parcel recognition error (step S1211). For example, a red projection image is generated with a square frame including "?" as described above. After generating the projection image indicating the parcel recognition error, processor 34 returns to the main routine and restarts the process from step S120. Meanwhile, this process is merely an example, and parallel processes may be performed by setting up a thread.

In a case where it is determined that a sorting destination is within the range of the value used in the present system (Yes in step S1213), processor 34 determines whether or not the label recording information is not used for other parcel (step S1214). Whether or not the label record information is not used for other parcel can be determined by accessing a data management server of a logistics company, for example. In a case where it is determined that the label recording information is not label recording information not used for other parcel (that is, label recording information used for other parcel) (No in step S1214), processor 34 generates a projection image indicating a parcel recognition error (step S1211). It is possible to determine whether or not label recording information is used for other parcel, for example, by referring to label record information read from a server which manages the label record information used for the parcel. For example, a red projection image is generated with a square frame including "?" as described above. After generating the projection image indicating the parcel recognition error, processor 34 returns to the main routine and restarts the process from step S120.

In a case where it is determined that the label recording information is not used for other parcel (Yes in step S1214), processor 34 determines whether or not parcel to which a label having the label recording information is attached is a target to be transported by transport conveyor 50 (a transport path) (step S1215). For example, this determination is performed by recording a range of label recording information of parcel to be transported by transport conveyor 50 for each transport conveyor 50 and determining whether or not the read label recording information is within the range. In a case where it is determined that the parcel is not a target to be transported by transport conveyor 50 (No in step S1215), processor 34 generates a projection image indicating that the parcel is not a target to be transported by transport conveyor 50 (step S1216). For example, a projection image of a color (for example, red) different from the normal time is generated in a square frame including "×". After generating the projection image indicating that the parcel is not a target to be transported by transport conveyor 50, processor 34 returns to the main routine and restarts the process from step S120. Meanwhile, this process is merely an example, and parallel processes may be performed by setting up a thread.

In a case where it is determined that the parcel is a target to be transported by transport conveyor 50 (Yes in step S1215), processor 34 returns to the main routine as it is so as to continue the process with no error, and restarts the process from step S120. Meanwhile, this process is merely an example, and parallel processes may be performed by setting up a thread.

In this manner, processor 34 generates a red projection image with, for example, a square frame including "?" in "a case where label recording information (for example, a barcode) of a label attached to parcel is not normally read by label reader 10" or in "a case of detecting that an error occurs in which a predetermined condition ("only one label is attached to the parcel?", "a sorting destination is within a range of a value used for the present system?", or "label record information not used for other parcel?") is not satisfied even if the label recording information of the label attached to the parcel can be normally read by label reader 10", and generates a red projection image with, for example, a square frame including "×" in "a case where parcel is not a target to be transported by transport conveyor 50 even if label recording information of a label attached to the parcel is normally read by label reader 10 and the predetermined condition is satisfied".

In the main routine in FIG. 6, after performing an error projection process based on a reading result of the label record information of the label attached to the parcel, processor 34 determines whether a current situation is a target of a general error or not (step S122). Here, the general error is an error which occurs, for example, in a case where an emergency stop button (not illustrated) of transport conveyor 50 is pressed or in a case where transport conveyor 50 abnormally generates heat.

In a case where it is determined that the current situation is a target of a general error (Yes in step S122), processor 34 generates a projection image indicating the general error (step S123). For example, a projection image of a color (for example, red) different from the normal time is generated in a square frame including "Err". After generating the projection image indicating the general error, processor 34 returns to step S120.

In a case where it is determined that the current situation is not a target of a general error (No in step S122), processor 34 generates a projection image indicating a sorting destination (step S124). The generation process of the projection image indicating the sorting destination is performed as illustrated in FIG. 8. In FIG. 8, processor 34 determines whether or not parcel passes through a specific region (a predetermined sorting area), based on label record information (for example, a barcode) of a label attached to the parcel and sensing information (step S1240). Here, the specific region is a part of a region defined as an area in which a worker sorts the parcel, and coordinates thereof are known. Therefore, it is possible to determine whether or not the parcel passes through the sorting area by calculating coordinates of the parcel using sensing information such as a distance image and a color image of the sorting area. In the present embodiment, since it is assumed that the worker can pick up the parcel even immediately after the parcel passes through the specific region, it is desirable that the specific region is narrower than the entire sorting area. In a case where it is determined that the parcel does not pass through the specific region (No in step S1240), processor 34 generates a projection image indicating the sorting destination (or a sorting location) (step S1241). That is, since the parcel does not pass through the specific region, the projection image having a white number indicating the sorting destination and a predetermined background color is generated so as to enable worker M to normally pick up the parcel. For example, if the sorting destination is "1", the projection image including "white number 1" and "yellow background color" is generated. In addition, if the sorting destination is "2", the projection image including "white number 2" and "green background color" is generated. Further, if the sorting destination is "3", the projection image including "white number 3" and "blue background color" is generated. After generating the projection image indicating that the parcel does not pass through the specific region, processor 34 returns to the main routine and restarts the process from step S120.

In a case where it is determined that the parcel passes through the specific region (Yes in step S1240), processor 34 generates a projection image having a square frame including a number indicating the sorting destination and a color (for example, red) indicating an error (step S1242). That is, since the parcel passes through the specific region, a projection image for causing worker M to recognize that an error occurs is generated. For example, if the sorting destination is "1", the red projection image including "number 1" and "a square frame" is generated. In addition, if the sorting destination is "2", the red projection image including "number 2" and "a square frame" is generated. Further, if the sorting destination is "3", the red projection image including "number 3" and "a square frame" is generated. After generating the projection image indicating that the parcel passes through the specific region, processor 34 returns to the main routine and restarts the process from step S120.

In this manner, processor 34 generates a projection image having a white number indicating a sorting destination and a predetermined background color in a case where it is determined that parcel does not pass through a specific region (a predetermined sorting area), and generates a projection image having a square frame including a number indicating the sorting destination and a color (for example, red) indicating an error in a case where it is determined that the parcel passes through the specific region. Another image may be used as the projection image indicating passage through the specific region. Meanwhile, since there is a possibility that the worker can still pick up the parcel immediately after the parcel passes through the specific region, it is desirable to generate a projection image including information indicating the sorting destination (a number in the example described above). As a result, even in a case where the worker who notices passage through the specific region picks up the parcel quickly, the parcel can be sorted into an appropriate sorting destination.

As described above, according to the present disclosure, in a case where an error occurs when indicating sorting of parcel, a projection image indicating the error occurrence is generated and projected on the parcel which is a target of the error. With this configuration, it is possible to more reliably notify a worker who pays attention to parcel of occurrence of an error. In the configuration in which the occurrence of an error is notified by an alarm or a sound, in a case where a large number of parcels are transported, it is not easy to specify parcel having occurrence of the error. In addition, in a case where the worker is a foreigner who does not understand the language, the error itself may not be recognized by the worker in the notification by a sound or the like. In the present disclosure, by generating and projecting an image indicating an error on parcel in which the error occurs, the worker can easily recognize the occurrence of the error.

In addition, according to the present disclosure, in order to resolve the generated error, a different projection image is generated and projected for each work to be performed by the worker. As an example, according to the present disclosure, different images are projected as a projection image indicating a parcel recognition error and a projection image indicating that the parcel is not a target to be transported by transport conveyor 50 (a transport conveyor error). Although an error classified as the parcel recognition error can be easily resolved (if label record information is read manually) by a worker regardless of the cause, the transport conveyor error is caused by an error occurring upstream, and the error cannot be resolved by the worker. Therefore, actions by the worker are different between these errors, and the projection images are different accordingly. As illustrated in FIG. 9, in the present disclosure, a projection image indicating another error is also handled by the same manner. In this manner, even if the worker himself does not understand details of the cause of the error, since the worker can handle the error as long as the worker recognizes a type of image to be projected, a worker who is not proficient in work also can reliably handle the error. Of course, if it is desired to more precisely distinguish between error types, different projection images may be generated for each error or errors to be projected as the same projection image based on other references may be grouped.

Further, according to the present disclosure, in a case where label recording information (for example, a barcode) of a label attached to parcel is not normally read by label reader 10, in a case where a predetermined condition is not satisfied even if the label recording information is normally read, and in a case where the parcel to be transported passes through a specific region without being picked up even if the label recording information is normally read and the predetermined condition is satisfied, the occurrence of the error can be notified to worker M and recognized by the worker M by generating a projection image indicating occurrence of an error, which can contribute to an improvement in sorting work efficiency.

Only a part of the error based on the reading result may be checked, and an order of determinations is not limited thereto.

Further, determinations of a recognition error and a transport conveyor error may be reversed.

In addition, an image different from the example described in the present disclosure may be generated and projected as a projection image indicating occurrence of an error. Further, such as a case of generating a projection image including a square having "×" when a recognition error occurs and generating a projection image including a square having "?" when a transport conveyor error occurs, the error and the projection image may be generated and projected based on a correspondence different from the example described in the disclosure described above.

Although the embodiment of a projection instruction device, a parcel sorting system, and a projection instruction method according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

In the present disclosure, notification of occurrence of an error is performed only by generating a projection image indicating the error and projecting the projection image on parcel, but the disclosure is not limited thereto. In addition to generation and projection of the projection image, notification by a sound or alarm may be performed. Meanwhile, in an environment in which many parcels are transported, a frequency of occurrence of errors increases, and if all the errors are notified by a sound or the like, work efficiency may be reduced. Specifically, in a case of performing notification by a sound, unless special equipment such as a directional speaker or the like is provided, all workers in the environment are notified, which may confuse a worker who is not related to the error. Therefore, the notification by a sound or the like may be performed only in a case of projecting a projection image indicating an error that parcel passes through a specific region, which is an error likely to cause a worker to overlook the parcel.

In the present disclosure, occurrence of an error is indicated by using red for a projection image indicating the error, but the disclosure is not limited thereto. For example, a shape of a projection image may be changed, for example, by projecting the projection image including a number and the like being enclosed in a rectangle when the normal time, and projecting the projection image in which the number and the like being enclosed in a triangle when there is an error. That is, as long as a worker who sees a projection image indicating an error can easily recognize the occurrence of the error, the projection image can have any characteristic.

In the present disclosure, a projection image indicating an error passing through a specific region is generated by using a number read from label recording information, but the disclosure is not limited thereto. In a case where reading the label recording information fails, another image such as a temporary number or another picture may be projected.

In the present disclosure, there may be a case where a plurality of errors repeatedly occur, for example, when parcel of which label record information cannot be read passes through a specific region without being picked up. In this case, a projection image indicating any one error may be generated preferentially and a projection image indicating another error may not be generated, or a projection image indicating all errors may be generated. In a case where the projection image indicating one of the errors is preferentially generated, an error related to a sorting area may be prioritized over an error related to another sorting area in which parcel currently exists. As an example of the error related to the sorting area in which the parcel currently exists, an error in reading label registration information, which is likely to be solved in the sorting area, is considered. As an example of the error related to the other sorting area, an error which affects sorting work in the other sorting area (for example, an error passing through a specific region which affect downstream processes), or an error which can be solved only in the other sorting area (for example, a transport conveyor error which cannot be resolved without going up to upstream processes) can be considered. Further, in a case of projecting a projection image indicating all errors, it is difficult for a worker to recognize the occurrence of each error unless a projected area of parcel is sufficiently large. According to a size of the surface of the parcel on which the projection image is projected (the projection surface), it may be switched between projecting only a projection image indicating any one of errors and projecting a projection image indicating all errors. An example of a projection image indicating a plurality of errors may include simply arranging projection images indicating the respective errors, or an image obtained by integrating projection images indicating the respective errors (for example, one square including "×", "?", and a number). In this case, in a case where a projection surface is narrow, one or more errors to be projected may be selected based on the same reference as in a case where a projection image indicating any one error is preferentially selected. Further, as a projection pattern, an image may blink (flashing) or may be an animation.

[Correspondence Example at Time of Error Occurrence]

FIG. 9 illustrates an example of a correspondence for each error, but there is a possibility that some errors can be solved by moving parcel P to a special path. Specifically, in a case of an error due to a recognition error in label reader 10, there is a possibility that a label can be correctly recognized if the label is read by label reader 10 again. Further, in a case of an error in which the existence of the parcel itself cannot be recognized by parcel sorting system 100 at first, it is difficult to notify the error by a projection image itself, and this case cannot be dealt with by the examples illustrated in FIG. 9. Therefore, hereinafter, a configuration in which parcel P having an error occurring is moved to a predetermined path so as to resolve the error will be described.

As a destination of parcel P having an error occurring, for example, it is conceivable that parcel P is returned to upstream of the same transport conveyor or moved to another transport conveyor. The configuration of returning parcel P to upstream of the same transport conveyor is useful, for example, in a case where label reading fails due to a factor such as parcel P overlapping with another parcel. In this case, even in the same environment, if the reading is performed again without any other parcel, it is possible to specify the correct sorting destination. On the other hand, the configuration of moving parcel P to another transport conveyor is useful in a case where reading fails due to an environmental factor such as arrangement of sensors or ambient brightness. In this case, if arrangement of components or the surrounding environment is different in parcel sorting system 100, the label of parcel P may be correctly read. In addition, as a transport destination of the other transport conveyor, a region in which a skilled worker performs sorting by hand (for example, manually reading the label by using a handy scanner, or visually checking an address on the label by the worker) may be provided. Since the number of parcels for which an error occurs is small relative to a total number of parcels handled by parcel sorting system 100, the number of skilled workers to be secured may be small. Therefore, even with such a configuration, a cost required for sorting the parcels can be reduced.

FIG. 10 schematically illustrating disposition of the transport conveyor for realizing the process described above, in a case of adopting a transport conveyor on which a skilled worker performs sorting as an example of another transport conveyor. In FIG. 10, a gray transport conveyor is a conveyor on which a beginner worker sorts parcels P with a support of parcel sorting system 100. Label reader 10 constituting parcel sorting system 100 is disposed upstream of the gray transport conveyor. As described above, parcel sorting system 100 includes other components, but the components are omitted in FIG. 10.

A black transport conveyor is a conveyor on which a skilled worker sorts parcels P. The transport conveyor for the skilled worker does not necessarily need to receive the support of parcel sorting system 100.

Shooter 1001 is a path for moving parcel P having an error occurring to upstream or another transport conveyor.

Shooter 1002 is a path for a skilled worker to return parcel P to the upstream portion of the gray transport conveyor again.

By arranging the transport conveyors in this manner, parcel P can be moved upstream of the same transport conveyor, or can be sorted by the skilled worker.

In FIG. 10, in order to realize both the process of moving parcel P to upstream and the process of sorting parcel P by the skilled person, the movement to upstream is performed by determination of the skilled worker, but is not limited thereto. Shooter 1001 may be directly connected to upstream of the gray transport conveyor, and may be moved to upstream without the determination of the skilled worker. In the same manner, regarding parcel P flowed to the skilled worker without shooter 1002, the skilled worker may complete the sorting work (that is, do not return to upstream of the gray transport conveyor).

There are various means for instructing the beginner worker to move parcel having an error occurring to shooter 1001.

For example, even in a case where label reading fails, when a position of parcel P can be tracked, a projection image indicating that parcel P is returned to upstream or another transport conveyor may be generated and projected as a projection image indicating an error. In this case, in order to distinguish the projection image from a projection image of a parcel having no error occurring, a color, a shape, an animation, and the like of the projection image may be different from the case where no error occurs. In a case where a plurality of shooters or other transport conveyors are arranged, identification information of the shooter or the transport conveyor to which parcel P is moved may be included in the projection image. Although a label cannot be read, if the same parcel can be recognized based on a shape of parcel P or the like, a destination may be changed according to the number of times the label reading fails. For example, if the parcel returned a plurality of times upstream still fails to read the label, there is a high possibility that a cause of the failure is congeniality between parcel P and an environment of the transport conveyor or a label itself of parcel P. In this case, even if parcel P is returned to upstream of the same transport conveyor again, a probability that the error is resolved is low. Therefore, in this case, repetition of the error may be prevented by projecting a projection image suggesting movement to another transport conveyor. Further, by projecting the number of times the label reading fails with a small number or the like in the projection image, or changing the content of the projection image into a content indicating a stronger warning each time the failure is repeated (for example, yellow or red), the worker may be notified of seriousness of the error occurring in parcel P.

In addition, the means which moves parcel P having an error occurring to upstream or another transport conveyor is not limited to the instruction by the projection image. Specifically, in a case where parcel sorting system 100 cannot recognize the shape itself of parcel P, the projection image itself cannot be projected on parcel P. In this case, for example, it is useful to instruct the worker in advance that "You should move parcel P on which a projection image is not projected to a transport conveyor destined to upstream or another predetermined transport conveyor". In the same manner, by instructing the worker that "You should move parcel P on which an image indicating an error is projected to upstream or another transport conveyor", even if the projection image disclosed above is used as it is, parcel P can be moved to upstream or to another transport conveyor by determination of the worker.

Further, a configuration in which parcel P is automatically sent to shooter 1001 is also conceivable, for example, by providing a movable stick or the like for pushing parcel P out on the transport conveyor. In this case, normally recognized parcel P may be caught and sent by shooter 1001, but the process of receiving parcel P is performed when being passed again upstream of the transport conveyor and normally recognized again, or when being sorted by a skilled worker. Therefore, even if such a case occurs, an influence on the overall performance of the parcel sorting is small.

INDUSTRIAL APPLICABILITY

The present disclosure is useful to provide a projection instruction device, a parcel sorting system, and a projection instruction method capable of detecting an error that label recording information of a label attached to parcel is not read, or an error that parcel to be transported passes through a specific region without being picked up.

REFERENCE MARKS IN THE DRAWINGS

10 LABEL READER
20 IMAGE SENSOR
22 DISTANCE IMAGE SENSOR
24 COLOR IMAGE SENSOR
30 PROJECTION INSTRUCTION DEVICE
32 INPUT UNIT
34 PROCESSOR
36 MEMORY
38 OUTPUT UNIT
40 PROJECTOR
50 TRANSPORT CONVEYOR
60 IMAGING PROJECTION DEVICE
100 PARCEL SORTING SYSTEM
P PARCEL

The invention claimed is:

1. A parcel sorting system comprising:
a transport conveyor that transports a parcel;
a label reader that reads parcel identification information from a label attached to the parcel;
a projector; and
a projection instruction device that includes a processor and a memory,
wherein the projection instruction device
instructs the projector to project a first projection image on the parcel, the first projection image including an instruction to sort the parcel to a destination corresponding to the parcel identification information read by the label reader, in a case where the label reader successfully reads the parcel identification information from the label, and
instructs the projector to projects a second projection image on the parcel, the second projection image including an instruction to sort the parcel to a path connected to a label reader, in a case where the label reader fails to read the parcel identification information from the label.

2. The parcel sorting system of claim 1, wherein the projection instruction device instructs the projector to project the second projection image including an instruction to sort the parcel to the path connected to an upstream position of the label reader which has failed to read the parcel identification information, in the case where the label reader fails to read the parcel identification information from the label.

3. The parcel sorting system of claim 1, wherein the projection instruction device instructs the projector to project the second projection image including an instruction to sort the parcel to the path connected to a different label reader than the label reader which has failed to read the parcel identification information, in the case where the label reader fails to read the parcel identification information from the label.

4. The parcel sorting system of claim 3, further comprising
a different transport conveyor than the transport conveyor, wherein,
the different label reader is disposed at the different transport conveyor, and
the second projection image including the instruction to sort the parcel to the path connected to the different label reader is a projection image including an instruction to sort the parcel to a path connected to the different transport conveyor.

5. The parcel sorting system of claim 1, wherein
the projection instruction device
counts the number of times the label reader has failed to read the parcel identification information from the label attached to the parcel, and
determines which of (a) an instruction to sort the parcel to the path connected to an upstream position of the label reader which has failed to read the parcel identification information, and (b) an instruction to sort the parcel to the path connected to a different label reader than the label reader which has failed to read the parcel identification information, is to be included in the second projection image, according to the counted number of times the parcel identification information of the parcel has been failed to be read by the label reader.

6. A projection instruction device, which is used together with a transport conveyor that transports a parcel, a label reader that reads a label attached to the parcel transported by the transport conveyor and a projector, the projection instruction comprising:
a processor and a memory, wherein
the processor, by cooperating with the memory,
instructs the projector to project a first projection image on the parcel, the first projection image including an instruction to sort the parcel to a destination corresponding to the parcel identification information read by the label reader, in a case where the label reader successfully reads parcel identification information from the label, and
instructs the projector to project a second projection image on the parcel, the second projection image including an instruction to sort the parcel to a path connected to a label reader in a case where the label reader fails to read the parcel identification information from the label.

7. The projection instruction device of claim 6, wherein the processor instructs the projector to project the second projection image including an instruction to sort the parcel to the path connected to an upstream position of the label reader which has failed to read the parcel identification information in the case where the label reader fails to read the parcel identification information from the label.

8. The projection instruction device of claim 6, wherein the processor instructs the projector to project the second projection image including an instruction to sort the parcel to the path connected to a different label reader than the label reader which has failed to read the parcel identification information in the case where the label reader fails to read the parcel identification information from the label.

9. The projection instruction device of claim 8, wherein the different label reader is disposed at a different transport conveyor than the transport conveyor, and
the second projection image including the instruction to sort the parcel to the path connected to the different label reader is a projection image including an instruction to sort the parcel to a path connected to the different transport conveyor.

10. The projection instruction device of claim 6, wherein the processor counts the number of times the label reader has failed to read the parcel identification information from the label attached to the parcel, and determines which of (a) an instruction to sort the parcel to the path connected to an upstream position of the label reader which has failed to read the parcel identification information, and (b) an instruction to sort the parcel to the path connected to a different label reader than the label reader which has failed to read the parcel identification information, is to be included in the projection image, according to the counted number of times the parcel identification information of the parcel has been failed to be read by the label reader.

\* \* \* \* \*